TELEPHONE NUMBER INDEX WITH CONTACT HOLDING ATTACHMENT DEVICE

Filed Sept. 24, 1962

INVENTOR.
DANIEL MALACHUK

BY Bernard Olcott

ATTORNEY

United States Patent Office 3,083,493

Patented Apr. 2, 1963

3,083,493

TELEPHONE NUMBER INDEX WITH CONTACT HOLDING ATTACHMENT DEVICE

Daniel Malachuk, Watchung, N.J., assignor to National Franchise Marketing and Leasing Corporation, Bloomfield, N.J., a corporation of New Jersey Filed Sept. 24, 1962, Ser. No. 225,808
6 Claims. (Cl. 45—.5)

This invention relates to telephone number index devices which are universally adaptable to be used with desk type telephone instruments of the types either having or not having projecting supporting feet and also in conjunction with wall type telephone instruments.

An object of the invention is to provide an improved telephone number index device which can be quickly installed or removed from a telephone instrument without tools and without damaging or marring the telephone instrument.

Another object of the invention is to provide an improved telephone index which can be universally fitted to many desk type telephone instruments of somewhat different shape and size as found in various parts of the United States and the world.

Another object of the invention is to provide an improved telephone number index which will be reliably secured to the telephone instrument, will not accidentally become dislodged therefrom by usual and even some extraordinary manipulations of the telephone index device or the telephone instrument and will not scratch or mar the table or desk surface upon which the desk type telephone instrument is placed.

Another object of the invention is to provide an improved telepheone number index which in the main is concealed and out of sight in its closed position from the telephone user.

Another object of the invention is to provide an improved telephone number index which furnishes protection to the index cards against soiling, mutilation through handling, or other similar environmental conditions.

Another object of the invention is to provide an improved telephone number index which furnishes effective advertising display space.

Still another object of the invention is to provide an improved telephone number index device which can be placed alongside of a wall telephone instrument.

A principal feature of the telephone number index according to the invention is to provide a new and novel means for anchoring the telephone number index to the bottom surface of a telephone instrument without the use of elastic bands or other elastic means as featured in the prior art. Such elastic bands and elastic means are objectionable because of their unsightly appearance which detract from the esthetic artistic appearance of the telephone unit as created by painstaking efforts of telephone instrument designers.

As contemplated, there is provided according to the invention a telephone number index adapted for use in conjunction with a telephone instrument which comprises a frame member and an attachment member having one face secured to the frame member and another face adapted to adhere, by adhesive and/or magnetic attraction phenomena, to another surface. Such other surface may be the bottom surface of a desk type telephone instrument with or without feet, or a wall supporting a wall type telepheone instrument.

Other objects and features of the present invention will be set forth or apparent in the following description and claims and illustrated in the accompanying drawings, which disclose by way of example and not by way of limitation, in a limited number of embodiments, the principal of the invention and structural implementations of the inventive concept.

In the drawings, in which like reference numbers designate like components in the several views.

Figure 1:
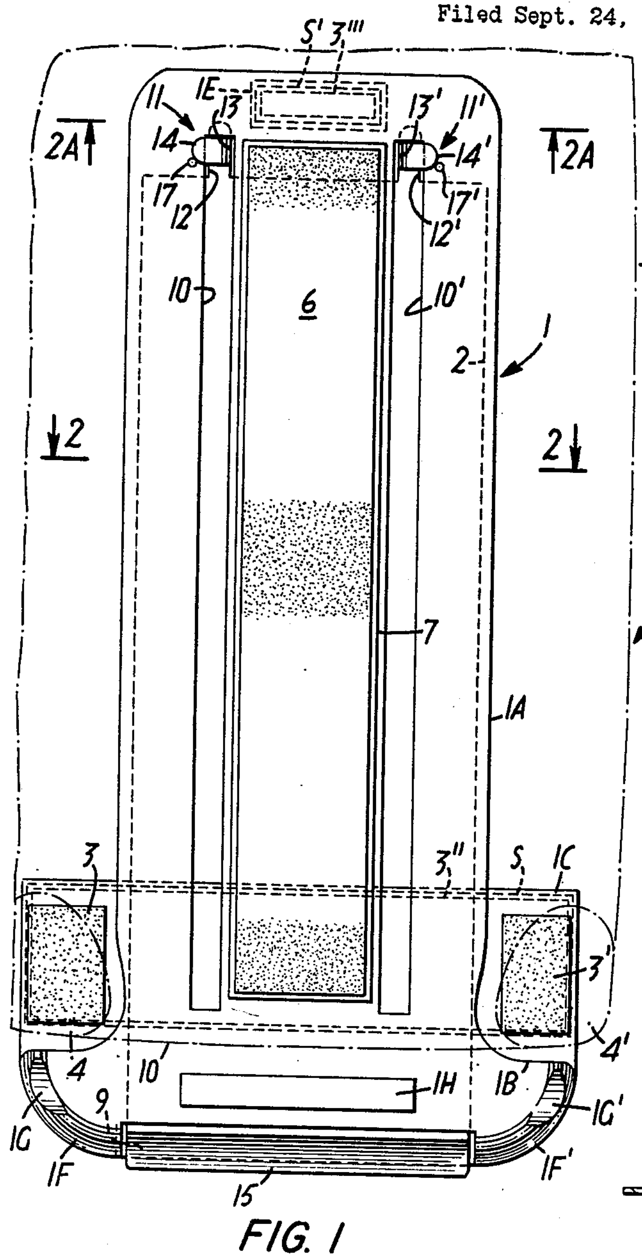
FIG. 1 is a plan view of one embodiment of a telephone number index with a pencil rack according to the invention.

As shown in FIG. 1 which illustrates one embodiment of the invention, a telephone number index comprises a frame member 1 and a slide member 2, the telephone number index being principally, but not necessarily only, designed for placement beneath a desk type telephone instrument T normally having four projecting feet which provide a normal clearance of about one-quarter to three-eighths of an inch between the bottom of the instrument and the supporting surface. Frame member 1 and slide member 2 can advantageously be formed of plastic, metal, fiber board or other suitable material.

Frame 1 is generally a flat member having a narrow longitudinal portion 1A terminating in a front broad transverse portion 1B. The width of the longitudinal portion 1A is selected so that it will pass between the front supporting feet 4, 4′, if any, of a desk type telephone instrument T so that the front two telephone feet 4, 4′ can straddle the narrow frame portion 1A with appreciable clearance as shown in FIG. 1, with practically no clearance, or so that the frame member 1A engages the feet 4, 4′.

According to a principal feature of the invention, the frame member 1 is releasably held to the telephone instrument T, without marring or damaging the latter, in a manner so that the frame 1 of the telephone index is securely anchored to the telephone instrument and disposed in the normally unoccupied space between the bottom of the telephone instrument and the supporting surface therefor, such desired anchoring being accomplished without the use of elastic bands or other elastic means which have been featured in the prior art.

Figure 2A:
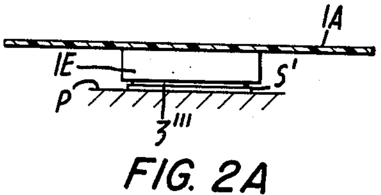
FIG. 2A is a sectional view of the telephone number index taken on line 2A—2A of FIG. 1.
Figure 2:
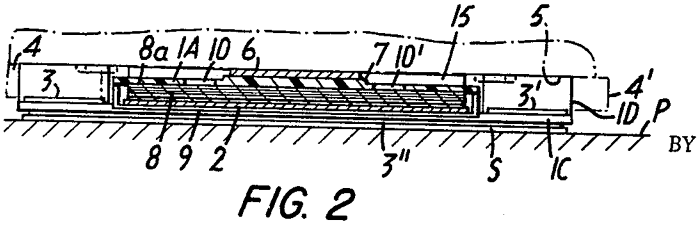
FIG. 2 is a sectional view of the telephone number index taken through line 2—2 of FIG. 1.

In one embodiment of the invention as shown in FIGS. 1 and 2, the attachment means for anchoring the index frame 1 to the bottom of the telephone instrument comprises a centrally located longitudinal strip of tape 6 having a pressure sensitive adhesive coating on each of its opposite sides, such a tape #465 or Y400 manufactured by Minnesota Mining & Manufacturing Co., U.S.A. The double faced tape is applied to the frame member 1A so that one of its adhesive faces secures the tape 6 to the index frame member.

When the embodiment of the invention is intended for use with a telephone instrument having four projecting feet (the front two of which are shown in FIGS. 1 and 2 as 4, 4′) the frame member 1 may optionally have a front lower shelf member 1C which is approximately as wide as and spaced below the front broad transverse portion 1B by a wall 1D, portions 1B, 1C and 1D being preferably formed integrally with frame portion 1A. Wall 1D is selectively dimensioned to provide clearance for the slide member 2 and to assure that the top surface of the front lower shelf 1C engage sthe bottom surfaces of the front telephone feet 4, 4″ as the exposed pressure sensitive surface of tape 6 engages the bottom surface 5 of telephone instrument T.

Consequently, the telephone number index can be reliably secured to the telephone instrument by pressing the frame 1 carrying the tape 6 with its exposed adhesive surface against the bottom surface 5 of the telephone instrument T after the narrow longitudinal frame portion 1A passes between the front supporting feet 4, 4' of the telephone instrument. The adhesive tape 6 should preferably have characteristics so that a secure releasable attachment can be made to the under side 5 of the telephone instrument without damaging or marring the finish on the latter. Also, the adhesive face of the tape 6 which engages the frame 1 should preferably be specially designed to strongly adhere to the material employed for the frame member.

Optionally, the outboard portions of the lower front shelf 1C may have secured thereto patches 3, 3' of pressure sensitive double faced tape, one exposed surface of each patch being engageable with the bottom surface of one of the front telephone feet 4, 4', respectively, for improviing the anchorage of the telephone index to the telephone instrument.

The under surface of front lower shelf 1C may carry a strip of double faced pressure sensitive tape 3'' covered by a removable paper or felt strip S. Also, frame member 1A may optionally have a downwardly projecting rear shelf 1E as shown in FIG. 2A for carrying a strip of double faced pressure sensitive tape 3''' covered by a removable paper or felt strip S', the lower surface of rear shelf 1E being at the same level as the lower surface of the front shelf 1C. The paper or felt strips S and S' prevent the index frame, which may be of hard plastic, fiber board or metal, from scratching the supporting surface or table P when the telephone index is pressed upon P by the weight of the telephone instrument T.

Since the under side of a telephone instrument has a number of small projections, such as bolts and nuts and the like, the frame member 1A can preferably have a raised panel portion 7 as best shown in FIG. 2 for receiving the adhesive double faced tape 6, such raised panel portion providing the necessary clearance to accommodate the nuts and bolts and the like projecting from the bottom 5 of the telephone instrument. When the frame member 1 is fabricated of plastic, the raised panel portion 7 can advantageously and preferably be formed integrally with the plastic frame member.

Figure 3:
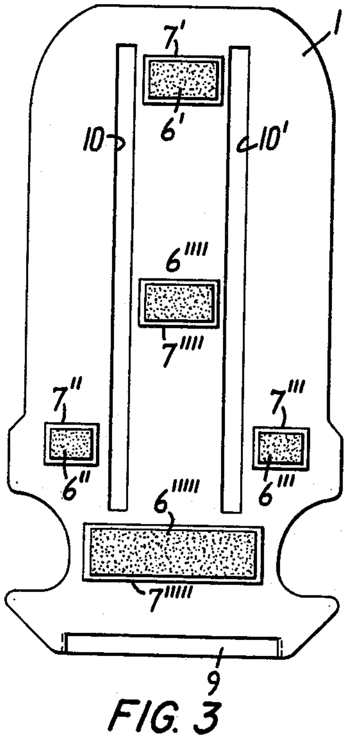
FIG. 3 is a plan view of a modified embodiment of a telephone number index.

While the adhesive tape 6 and its associated preferred raised panel portion 7 are each shown in FIG. 1 as a one piece relatively wide strip taking up a major longitudinal position of the frame member 1A, in other embodiments of the invention, the attachment means may be modified as shown in FIG. 3. In one modification, a centrally located adhesive patch of double faced tape 6' may be short and disposed towards the rear end of the frame member 1A, the front end of frame member 1A having a pair of spaced relatively small patches of double faced adhesive tape 6'', 6''' each carried upon a raised panel portion 7', 7'', 7''', respectively, if necessary so that the top faces of 6' 6'' and 6''' evenly engage the bottom surface 5 of the telephone instrument while providing clearance for projecting nuts and bolts and the like.

The pieces or separate patches of double faced adhesive tape need not be three in number as arranged in a triangle. Such tape patches can be two three, four or more in number positioned in any desirable pattern including separate spaced pieces 6', 6'''', 6''''' arranged in a line as shown in FIG. 3 along the longitudinal central axis of the frame member. Alternatively, elements 6, 6' . . . 6''''', 7, 7' . . . 7''''' of FIGS. 1, 2 and 3 may each be replaced by a soft plastic foam tape of appreciable thickness having two pressure sensitive adhesive faces, such as manufactured by Minnesota Mining & Manufacturing Co., U.S.A., as Tape Y9063B. It is particularly advantageous to use such type tape for the combination 6''''', 7''''' when the bottom 5 of the telephone instrument has a recess near the front end thereof.

FIG. 3 also shows other modifications of the invention such as a frame member having a different outline and an omission of the pencil rack portion.

In other embodiments of the invention, the attachment devices 6', 6'', 6''', 6'''' 6''''' or any subgroup of them as shown in FIG. 3 may comprise permanent magnets instead of the plurality of patches of double faced adhesive tape. Such magnets are secured to the frame member 1A, as for instance by glue or cement, and depending upon the thickness of the magnets, the frame member 1A may either have recessed pockets or raised panel portions 7', 7'', 7''', 7'''', 7''''' to accommodate the magnets and provide the necessary clearance space between frame member 1A and the bottom surface 5 of the telephone instrument for accommodating the nuts and bolts and the like projecting from the latter. For such embodiments the telephone number index is releasably secured to the bottom surface 5 of the telephone unit, which is generally a steel plate, by magnetic attraction between the magnet or magnets and the iron content in bottom surface 5.

According to an optional feature of the invention, two upstanding walls 1F and 1F' formed preferably integrally with the frame member 1B at the front corner portions thereof have aligned semi-circular cavities 1G, 1G' to act as a pencil rest directly in front of the front edge 10 of the telephone instrument T. By such feature, a very convenient position is provided to receive and store a pencil and thus prevent on the part of the telephone user the usual hunting and reaching for pencils which are often misplaced or out of reach. Optionally, and to assure that the pencil is not accidentally jolted from its proper resting place in grooves 1G, 1G' a magnet 1H can be secured, as by cementing or gluing to frame member 1 in an aligned relationship with the grooves 1G, 1G' and at a height so as to engage a steel jacketed pencil, preferably brass or gold plated, when it rests in the grooves 1G, 1G'.

The upstanding corner walls 1F, 1F' may optionally also extend in a downward direction to the front lower shelf 1C. Such a feature will considerably improve the appearance of the exposed front portion of the telephone number index by giving it an appearance of depth.

It is to be understood that a device made up with all the optional features as shown in FIGS. 1, 2 and 2A will provide a universal telephone index which can be generally adapted to desk type telephone instruments, with or without projecting supporting feet, as well as with wall type telephone instruments.

When the telephone instrument has projecting feet, the front two telephone feet will straddle frame member 1A and bear upon the telephone supporting surface (or optionally upon the top face of the double faced adhesive tape patches 3', 3'') while the under belly of the telephone instrument engages the exposed surface of double faced adhesive tape 6.

When the desk type telephone instrument has no projecting feet, the strip 6 of double faced adhesive tape provides the attachment between the index device and the belly of telephone instrument. In such applications, separate disks, of say ¼'' cork, fibre, or soft plastic, having a single pressure sensitive adhesive face may be applied to the bottom surface 5 of the telephone instrument to serve as supporting feet to elevate the telephone instrument in the manner of feet 4, 4'. Optionally, the front and rear shelves 1C, 1E with protective felt strips S, S' may serve as feet for the footless instrument.

The index device of FIGS. 1, 2 and 2A can be used in conjunction with a wall type telephone instrument. For such application, the felt or paper protective strips S and S' are peeled off and the index device is anchored upon a vertical wall near the wall type telephone instrument by the sensitive exposed surfaces of double faced adhesive strips 3'' and 3'''. Optionally, a pad of note paper (not shown) may then be readily secured to the exposed surface of the double faced pressure sensitive adhesive tape 6. If magnets replace the double faced tape as disclosed in conjunction with FIG. 3, then the back of the note paper pad should incorporate a material, such as iron, which will be attracted to the magnets 7', 7'''', 7'''''. Such pad of note paper will be replaceable and provide effective advertising display space.

In spite of the fact that the frame 1 is held in vertical aspect, it is to be observed that the pencil rack grooves 1G, 1G' will nevertheless support and hold a pencil with a full or partial iron jacket when magnet 1H is incorporated into the frame 1 as hereinbefore explained in conjunction with FIG. 1.

As shown in FIG. 2, slide 2 is generally a flat member which is slidably carried below the frame member 1, the slidable member carrying a plurality of index cards 8. The index cards 8 are vertically stacked and preferably have their front ends notched in a staggered arrangement and marked with alphabetical indicia for quick reference. A top sheet 8a may preferably be an overlay sheet of plastic or paper either extending forwardly to cover the notched alphabetized portions of the index cards or cut short to expose the alphabet index and, in either case, may advantageously provide display surfaces for advertising matter.

At the front end 1B of frame member 1, a band member 9, preferably formed integrally with frame member 1, loosely surrounds or engages the underside of slide member 2 carrying the stacked index cards 8 thereon. The frame member 1A has two spaced longitudinal slots 10, 10' which straddle the attachment member 6 as well as its supporting platform 7, if any. At the rear end of slide member 2 there is disposed a pair of tongue members 11, 11' which are preferably formed integrally with the slide member 2. Each of the tongue members 11, 11' are intended to form slide tracks in cooperation with slots 10 and 10', respectively, so that they act in cooperation with band 9 to permit member 2 to have longitudinal sliding movement but to prevent transverse movement or rotary movement of the latter. Tongue member 11 has a portion 12 extending from and in the same plane as the slide member 2, an upstanding portion 13 perpendicular to slide member 2, which passes through the slot 10 in frame member 1A and a lip 14 contiguous with the upstanding portion 13 of length longer than the width of slot 10, the upstanding portion 13 being dimensioned so that lip 14 lightly engages the top surface of frame member 1. Upstanding portion 13 need not be limited to having a single wall, but may have short sections perpendicular thereto extending in the direction of the lip 14. Tongue member 11' comprising members 12', 13' and 14' are preferably identical with members 12, 13 and 14 of tongue member 11, but the lip 14' extends in the opposite direction to lip 14 for locking the rear end of slide member 2 to frame 1. Lip members 14 and 14' are designed to have a length relative to the width of slot 10 and 10' so that the slide member 2 can be assembled to frame member 1 by first passing the rear end of slide member 2 with the index cards 8 positioned thereon through band 9, secondly by flexing frame member 1A so as to insert lip 14 through slot 10 and thirdly by flexing frame member 1A so that lip 14' can be inserted through slot 10'.

In a preferable embodiment, the overlay member 8a has two anchoring holes therethrough (not shown), preferably slightly undersized, which can be placed over the lips 14 and 14'. The index cards 8 thereunder may either also have corresponding anchoring holes or they may be shorter at their rear ends than the overlay sheet 8a and held merely by pressure of the frame 1 and overlay sheet 8a upon the stack of index cards 8. Also, in a preferred embodiment, the front end of slide member 2 has integrally formed therewith an upstanding portion 15 having display space for indicia, the upstanding portion extending above the plane of the frame member 1.

To assure that slide member 2 will not automatically move to an open position by gravity when frame 1 is secured to a vertical wall (which may support a wall type telephone), projections 17, 17' are formed in frame member 1A so that a small amount of force is necessary to be applied to move the slide member 2 from its closed position, the applied force causing lip members 14 and 14' to override the projections 17, 17' respectively.

Figures 4, 5:
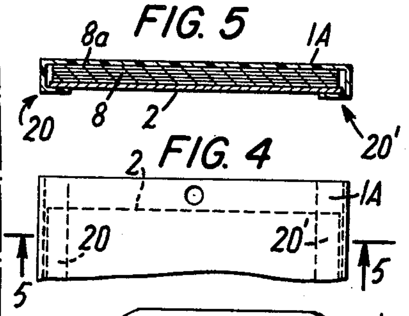
FIG. 4 is a plan view of another embodiment of a telephone number index according to the invention.
FIG. 5 is a cross sectional view taken on line 5—5 of FIG. 4.

Another embodiment of the invention is shown in FIGS. 4 and 5. In FIGS. 4 and 5 the slide 2 is guided in brackets 20, 20' underneath and along the longitudinal edges of member 1A thereby eliminating slots 10, 10' tongue members 11, 11' and band member 9. Index cards 8 and overlay card 8a may then be attached to slide member 2 by post members (not shown) or by staples.

While there has been described and pointed out the fundamental novel features of the invention as applied to preferred embodiments, it will be understood that various omissions and substitutions and changes in the form and details of the devices illustrated and its operation may be made by those skilled in the art, without departing from the spirit of the invention. It is the intention, therefore, to be limited only as indicated by the scope of the following claims. It is also to be understood that the term "adhere" is to include adhesive phenomenon and/or magnetic attraction phenomenon.

What I claim is:

1. A telephone number index adapted for use in conjunction with a telephone instrument, which comprises a frame member and an attachment means having a pair of faces, one face secured to said frame member and the other face adapted to adhere to another surface for releasably connecting said frame member to such other surface.

2. A telephone number index according to claim 1 including a slidable member having parallel longitudinal edges, a plurality of index cards disposed upon said slidable member and channel means depending from said frame member which slidably engage the longitudinal edges of said slidable member.

3. A telephone number index according to claim 1 including a slide member disposed beneath said frame member, a plurality of index cards carried by said slide member and disposed between said slide member and said frame member, said frame member having a transverse band portion at its front end to loosely engage the slide member and wherein said frame member has at least one longitudinal slot, said slide member having a projection which has a portion which passes through a slot and a portion contiguous with the latter which is transversely disposed to its associated slot for lightly engaging a portion of said frame member adjacent a longitudinal slot.

4. A telephone number index adapted for use with a desk type telephone instrument having a bottom surface, said index comprising a frame member, a movable member slidably mounted on said frame member, a plurality of index cards stacked on said movable member, said frame member having a mounting surface which is disposed above said stack of index cards, and an attachment means having a pair of faces, one face of said attachment means being secured to said mounting surface of the frame member and the other face of said attachment means being adapted to adhere to the bottom of said telephone instrument for releasably connecting said frame member to and under said telephone instrument.

5. A telephone number index adapted for use with a desk type telephone instrument having a bottom surface and at least two projecting feet therefrom, said index comprising a frame member, a movable member slidably mounted on said frame member, a plurality of index cards stacked on said movable member, said frame member having a mounting surface which is disposed above said stack of index cards, at least a portion of said frame member adjacent said stack of index cards having a thickness approximately the length of said feet and being selectively shaped to pass said two projecting feet therethrough and an attachment means having a pair of faces one face of said attachment means being secured to said mounting surface of the frame member and the other face of said attachment means being adapted to adhere to the bottom surface of said telephone instrument for releasably connecting said index to and beneath said telephone instrument.

6. A telephone number index according to claim 1 adapted for use in conjunction with a wall type telephone mounted on a vertical wall and wherein said one face of the attachment means is secured to the back side of said frame member and said vertical wall constitutes said another surface, said other face of the attachment means being adapted to adhere to said vertical wall for releasably connecting said frame member to the vertical wall.

References Cited in the file of this patent

UNITED STATES PATENTS

| | | |
|---|---|---|
| 2,701,932 | Hyman | Feb. 15, 1955 |
| 2,741,860 | Van Gieson | Apr. 17, 1956 |
| 2,770,472 | Whitwell | Nov. 13, 1956 |
| 2,778,151 | Hickerson | Jan. 22, 1957 |
| 2,990,639 | Van Gieson | July 4, 1961 |
| 2,995,863 | Bright | Aug. 15, 1961 |
| 3,052,056 | Eisenstein | Sept. 4, 1962 |

FOREIGN PATENTS

| | | |
|---|---|---|
| 537,241 | Great Britain | June 13, 1941 |